(12) United States Patent
Schaffer

(10) Patent No.: US 6,491,306 B2
(45) Date of Patent: Dec. 10, 2002

(54) WHEEL SUPPORT SYSTEM FOR AGRICULTURAL SPRAYER

(75) Inventor: James A. Schaffer, Clarion, IA (US)

(73) Assignee: Hagie Manufacturing Co., Clarion, IA (US)

( * ) Notice: Subject to any disclaimer, the term of this patent is extended or adjusted under 35 U.S.C. 154(b) by 0 days.

(21) Appl. No.: 10/028,201

(22) Filed: Dec. 20, 2001

(65) Prior Publication Data

US 2002/0053795 A1 May 9, 2002

Related U.S. Application Data

(62) Division of application No. 09/656,283, filed on Sep. 6, 2000.

(51) Int. Cl.[7] ............................................. B60G 17/005
(52) U.S. Cl. ................................. 280/5.502; 280/5.506
(58) Field of Search ........................ 280/124.157, 5.5, 280/5.502, 5.506, 5.507

(56) References Cited

U.S. PATENT DOCUMENTS

| | | | | |
|---|---|---|---|---|
| 4,949,989 A | * | 8/1990 | Kakizaki et al. | 188/266.7 |
| 5,150,917 A | * | 9/1992 | Kawabata | 280/124.157 |
| 5,597,172 A | * | 1/1997 | Maiwald et al. | 280/124.153 |

* cited by examiner

Primary Examiner—Paul N. Dickson
Assistant Examiner—Faye M. Fleming
(74) Attorney, Agent, or Firm—Brett J. Trout

(57) ABSTRACT

A wheel support assembly comprising a leg coupled to a wheel and rotatably coupled within a journal, wherein the end of the leg opposite the wheel is provided with a lateral planar surface, and a base plate is provided over the journal with a collar secured to the base plate and having a substantially flat surface is secured around the inner leg with the substantially flat surface provided over the planar surface. The wheel support assembly is also provided with a spring secured to a spring plate and means for rotating the base plate relative to the spring plate.

11 Claims, 6 Drawing Sheets

WHEEL SUPPORT SYSTEM FOR AGRICULTURAL SPRAYER

This application is a divisional of Ser. No. 09/656,283 filed Sep. 6, 2000.

BACKGROUND OF THE INVENTION

1. Field of the Invention

The present invention relates to a wheel support system for an agricultural sprayer and, more particularly, to a wheel support system provided with an improved wheel support leg and journal coupling which allows for ease of assembly and repair.

2. Description of the Prior Art

Wheel support systems for agricultural sprayers are known in the art. These systems typically involve an outer journal provided with an inner leg which rotates relative to the outer journal. The outer journal is typically secured to a frame of an agricultural vehicle, while the inner leg is secured to one of the vehicle's wheels. The upper end of the inner leg is often secured to a wheel support assembly and may be provided with a shock absorption or ride height adjustment mechanism, such as that described in U.S. Pat. No. 3,558,148.

One shock absorption system used in the prior art involves a pneumatic bag secured on one end to the inner leg, and secured on the other end to a bracket which is secured to, and rotates relative to, the outer journal. One drawback associated with such prior art wheel support systems is the difficulties in assembling and repairing the steering systems in the field. Because prior art wheel support systems often break down in the field, far from repair facilities, it is desirable to repair the wheel support systems on site, rather than transport the bulky field sprayer for repair. Although it would be desirable to provide releasable securement means for securing the wheel support assembly to the inner steerable leg of the agricultural sprayer, prior art systems involve non-releaseable weldments between the wheel support system and the inner leg. Weldments and similar securement mechanisms are used to assure tight tolerances and operability of the wheel support system in relation to the inner leg, and to transfer torque therebetween. Although it would be desirable to provide a releasable connection system, the prior art provides no suitable means for releasably connecting the parts while maintaining adequate tolerances to torque transfer. The difficulties encountered hereinabove are sought to be eliminated by the present invention.

SUMMARY OF THE INVENTION

In an advantage provided by this invention, a wheel support system is provided which allows for positive connection and torque transfer between a steering assembly and a leg journal.

Advantageously, this invention provides an engagement between a wheel leg and a steering system which may be easily removed and repaired in the field.

Advantageously, this invention provides means for removing a wheel leg from a supporting journal without requiring the breaking weldments or the like.

The present invention comprises a wheel support assembly for a ride height adjustable vehicle, comprising a journal, a leg rotatably coupled within the journal, the leg having a first end and a second end, a wheel coupled to the first end of the leg, wherein the second end of the leg is provided with a lateral planar surface, a base plate secured to the second end of the leg, a collar coupled to the base plate, wherein the collar is provided with a substantially flat surface provided over the planar surface, a spring having a first end and a second end, a spring plate secured to the first end of the spring, and means for rotating the base plate relative to the spring plate.

DETAILED DESCRIPTION OF THE PREFERRED EMBODIMENT

Figure 1:
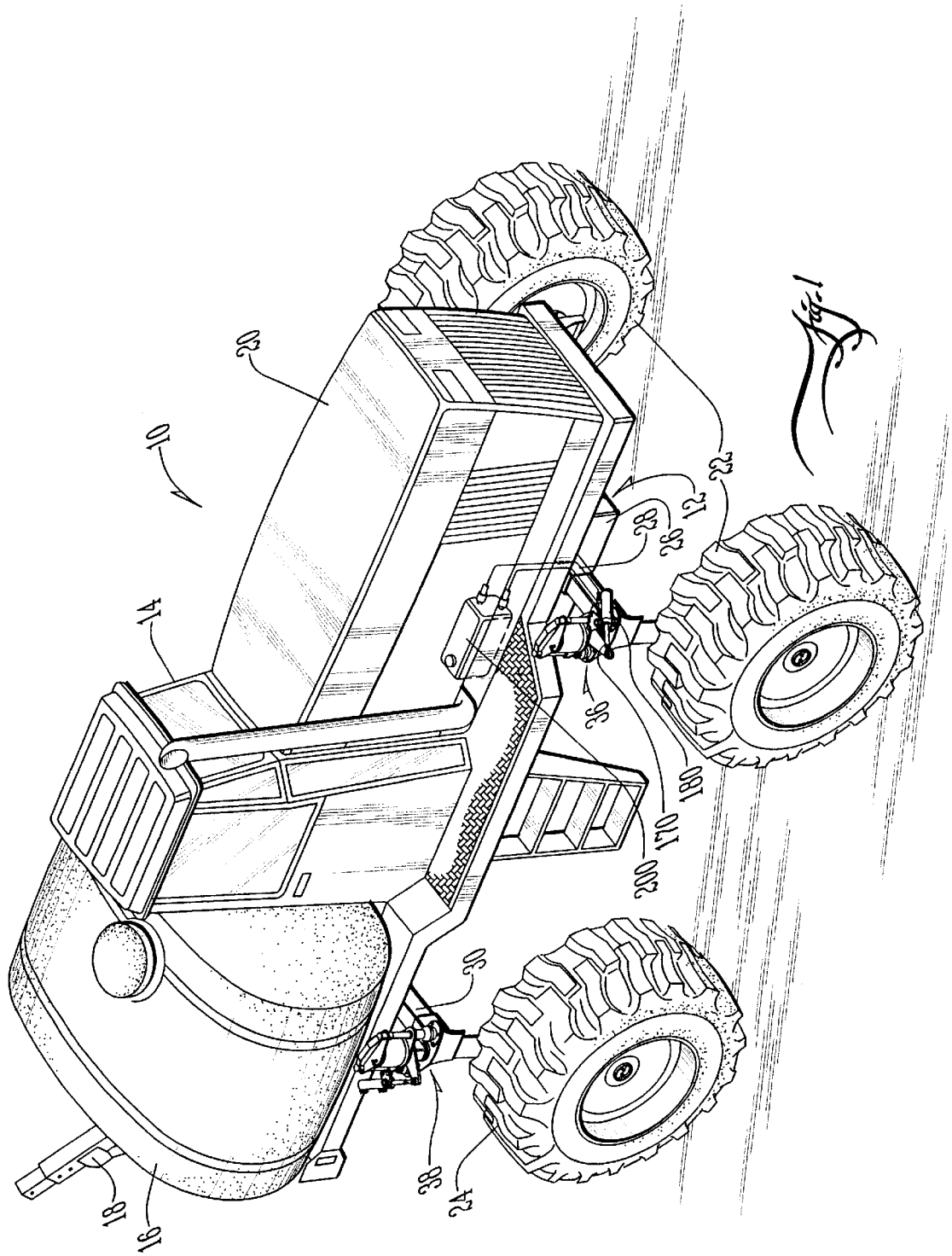
FIG. 1 illustrates a perspective view of an agricultural sprayer incorporating the steering mechanism of the present invention.

With reference to the drawings, an agricultural sprayer incorporating the steering system of the present invention is indicated generally as (10) in FIG. 1. As shown in FIG. 1, the agricultural sprayer (10) includes a frame (12), a cab (14), and a fluid tank (16). Secured to the frame (12) is a boom (18) for securement of a sprayer (not shown) or similar attachment. The agricultural sprayer (10). also includes an engine (2,0), a pair of front wheels (22) and a pair of rear wheels (24).

Figure 2:
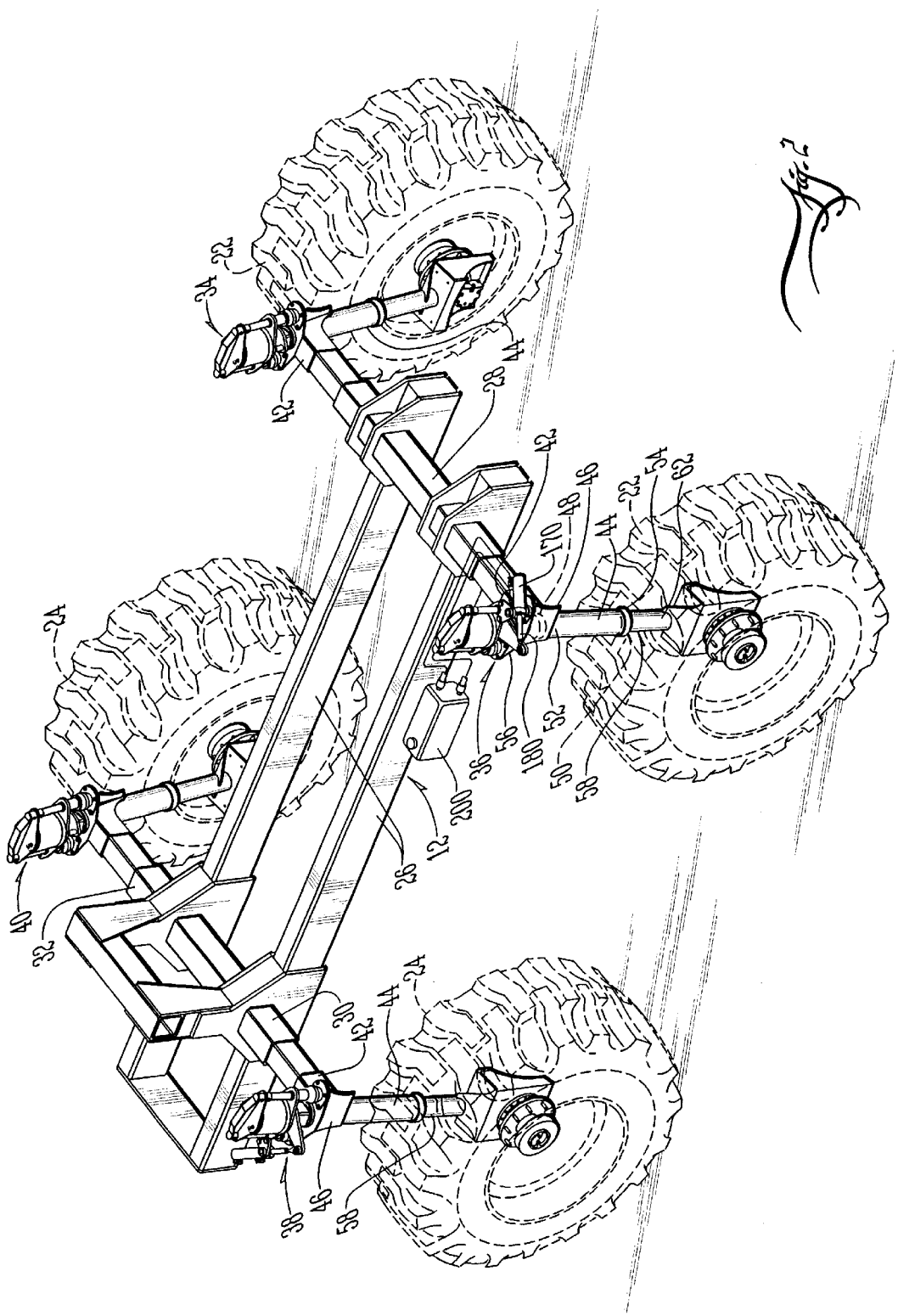
FIG. 2 illustrates a perspective view of the frame and steering assemblies of the agricultural sprayer of FIG. 1.

As shown in FIG. 2, the frame (12) includes a pair of side members (26) interconnected by a front transverse member (28). A rear traverse member (30) is welded, or otherwise secured, to the side members (26). Secured to the front transverse member (28) and the rear transverse member (30) are four steering assemblies (34), (36), (38) and (40). Since the steering assemblies (34), (36), (38) and (40) are of a like construction and similarly assembled, albeit as mirror imaged pairs, only the steering assembly (34) will be described in detail, with like numbers being applied to like parts.

Figure 6:
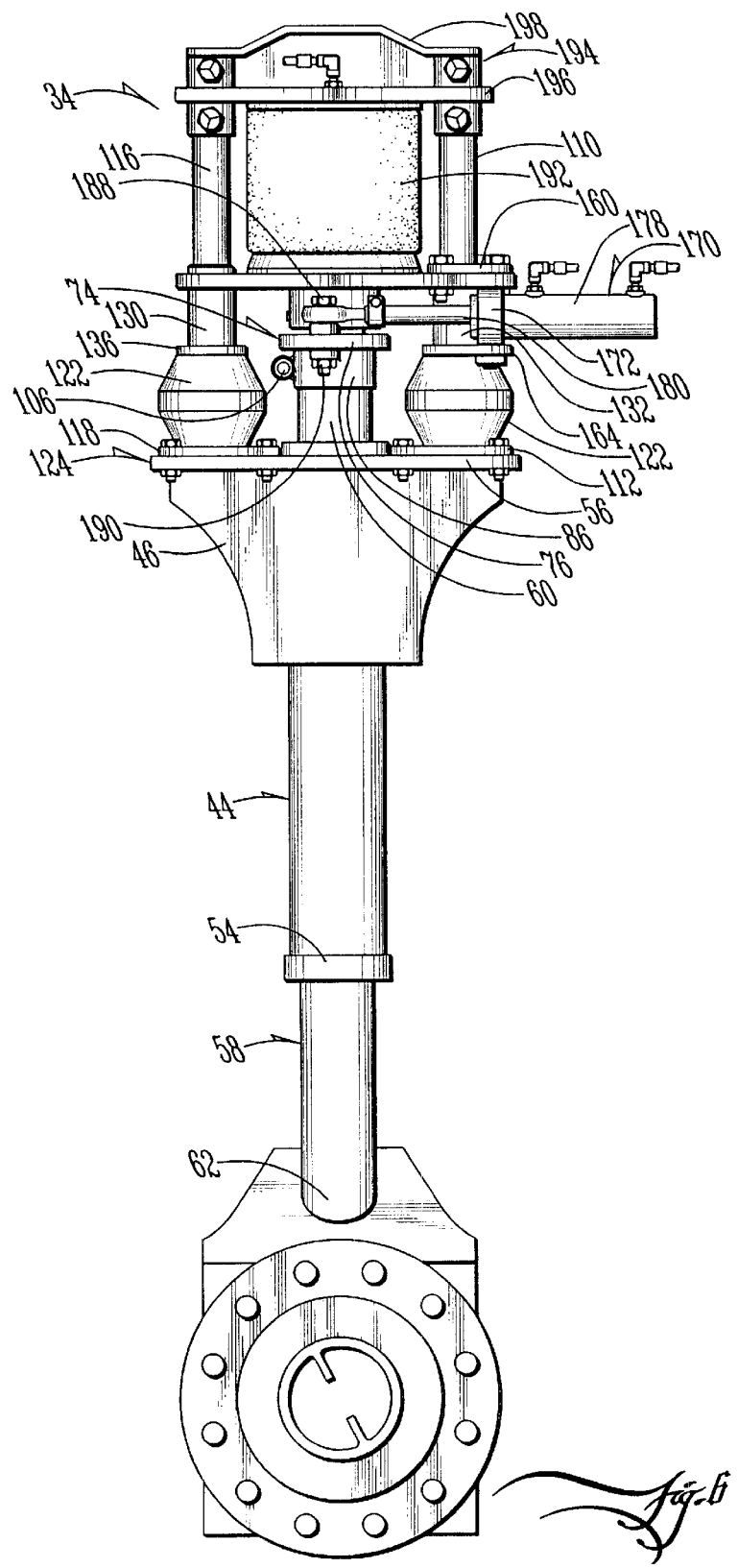
FIG. 6 illustrates a side elevation of the steering assembly of the present invention.
Figure 7:
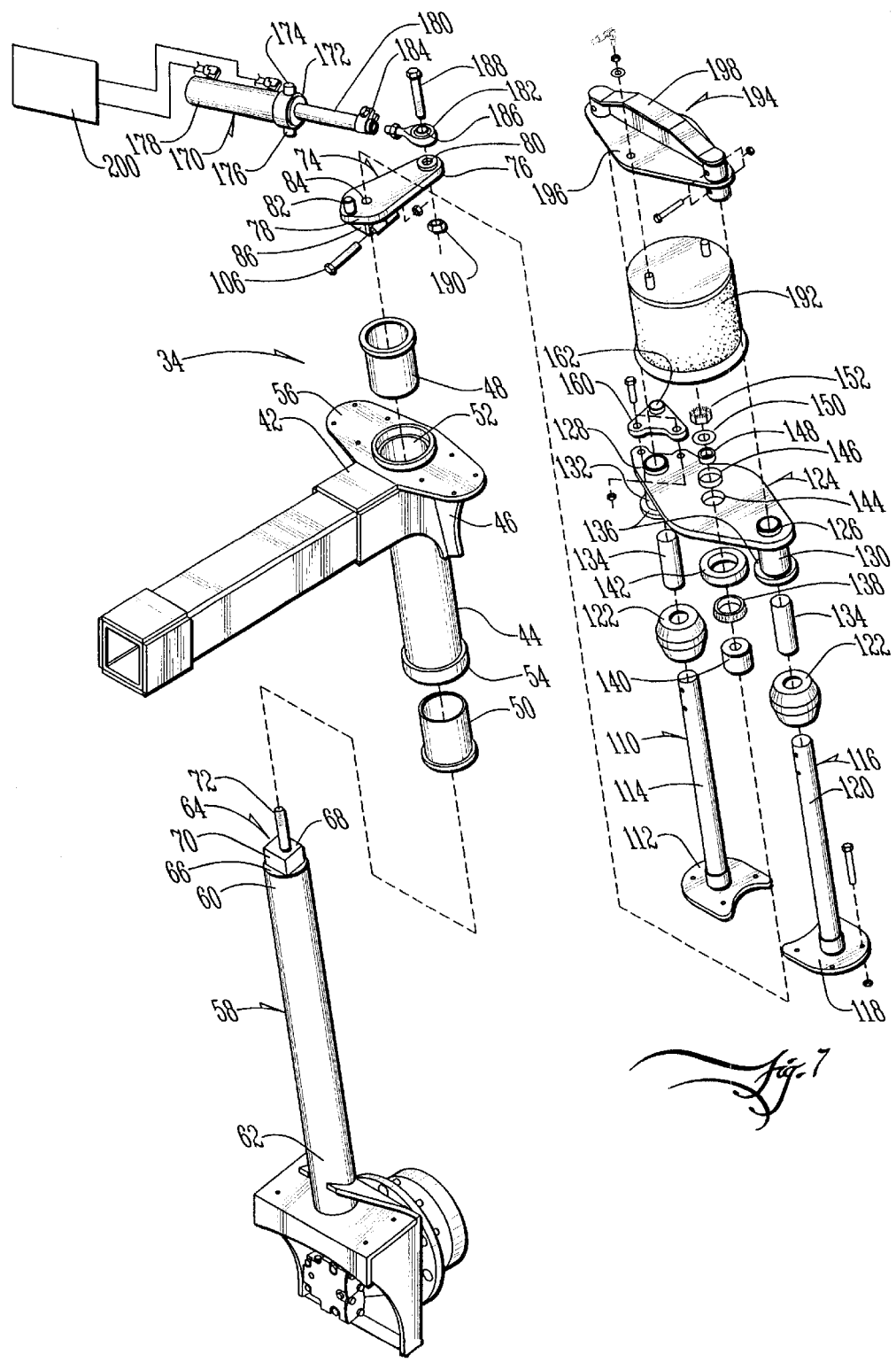
FIG. 7 illustrates an exploded view of the steering assembly of the present invention.

As shown in FIGS. 2–7, a leg sleeve (42) fits over the transverse member (28) to secure the steering assembly (34) to the transverse member (28). The leg sleeve (42) is welded or otherwise secured to an outer journal (44) by a shoulder (46) as shown in FIG. 7. The outer journal (44) is also provided with a pair of composite bushings (48) and (50), secured within the top (52) and bottom (54) of the outer journal (44). In the preferred embodiment, bushings (48) and (50), such as those sold under the trade name Orkot® are used. The bushings (48) and (50) may, of course, be constructed of any suitable material, such as molybdenum coated nylon, or any other bushing material known in the art. The outer journal (44) is also provided with a steel retaining flange (56).

Provided through the bushings (48) and (50) is an inner leg (58) having a top (60) and a bottom (62). The top (60) of the leg (58) includes a connection assembly (64) comprising a circular securement plate (66) welded or otherwise secured to the hollow leg (58) and to a torque transfer block (68). As shown in FIG. 7, the torque transfer block (68) is provided with four lateral planar surfaces (70), recessed so that none of the lateral planar surfaces (70) extend laterally beyond the leg (58). The lateral planar surfaces (70) are recessed so that the leg (58) may be inserted into and removed from the outer journal (44) without having to remove the torque transfer block (68) from the leg (58).

Figure 3:
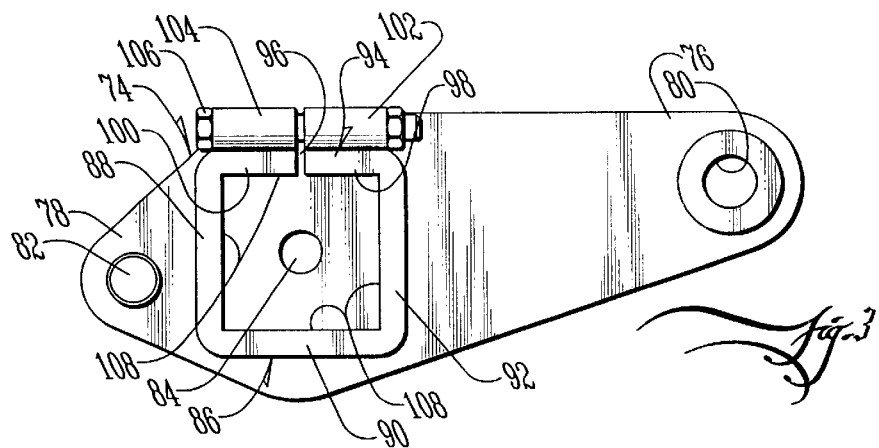
FIG. 3 illustrates a bottom plan view of the base plate of the present invention.

Provided through the torque transfer block (68), and welded thereto, is a bolt (72). Provided over the connection assembly (64) is a base plate (74). The base plate (74) includes a torque arm (76) and a stop arm (78) (FIG. 3). On the torque arm (76), the base plate (74) is provided with a bore (80). On the stop arm (78), the base plate (74) is provided with a steel post (82) welded or otherwise secured to the stop arm (78). Provided between the bore (80) and stop arm (78) is another bore (84) sized to accommodate the bolt (72).

Welded to the base plate (74), around the bore (84), is a collar (86) (FIG. 3). The collar (86) comprises a left wall (88), a rear wall (90), a right wall (92) and a front wall (94). In the preferred embodiment, the left wall (88), rear wall (90) and right wall (92) are welded or otherwise secured to the base plate (74).

The front well (94) of the collar (86) is provided with a split (96) which divides the front wall (94) into a first half (98) and second half (100). Welded to the first half (98) of the front wall (94) is a first bushing (102), and welded to the second half (100) of the front wall (94) is a second bushing (104). As shown in FIGS. 3 and 6, a bolt (106) is secured within the first bushing (102) and second bushing (104) which, when tightened, draws the first half (98) of the front wall (94) toward the second half (100) of the front wall (94). Approximately two centimeters of the left wall (88) and the right wall (92) closest to the front wall (94) are not welded to the base plate (74) to allow the halves (98) and (100) of the front wall (94) to move relative to one another. Accordingly, when the bolt (106) is tightened within the first bushing (102) and second bushing (104), the plurality of substantially flat surfaces (108) of the collar (86) engage the lateral planar surfaces (70) of the connection assembly (64) of the leg (58).

A first steel shaft assembly (110), including a first mounting plate (112) and a first steel shaft (114), is provided along with a second steel shaft assembly (116), including a second mounting plate (118) and a second steel shaft (120) (FIG. 7). The shafts (114) and (120) are secured to their respective mounting plates (112) and (118) by weldments. The mounting plates (112) and (118) are, in turn, bolted to the retaining flange (56). Provided over the shafts (114) and (120) are a pair of rubber springs (122) such as those known in the art. A spring plate (124) is preferably provided over the rubber springs (122). As shown in FIG. 6, the spring plate (124) is provided with a first bore (126) and second bore (128) to accommodate the shafts (114) and (120). Provided within the bore (126) and (128) are a first sleeve (130) and second sleeve (132), each provided with slide bearings (134). The sleeves (130) and (132) are preferably of steel construction and welded to the spring plate (124). The sleeves (130) and (132) are preferably provided with broad bases (136) to provide a greater contact surface with the rubber springs (122). As shown in FIG. 7, provided between the spring plate (124) and transfer block (68) over the bolt (72) is a bearing assembly (138), surrounding an inner spacer (140), and surrounded by a bearing cup (142) such as those known in the art. Similarly, the spring plate (124) is provided with a center bore (144) within which is provided a smaller bearing cup (146), and a smaller bearing assembly (148) which surrounds the bolt (72). Provided over the bolt (72) is a washer (150) and a nut (152).

Figure 4:
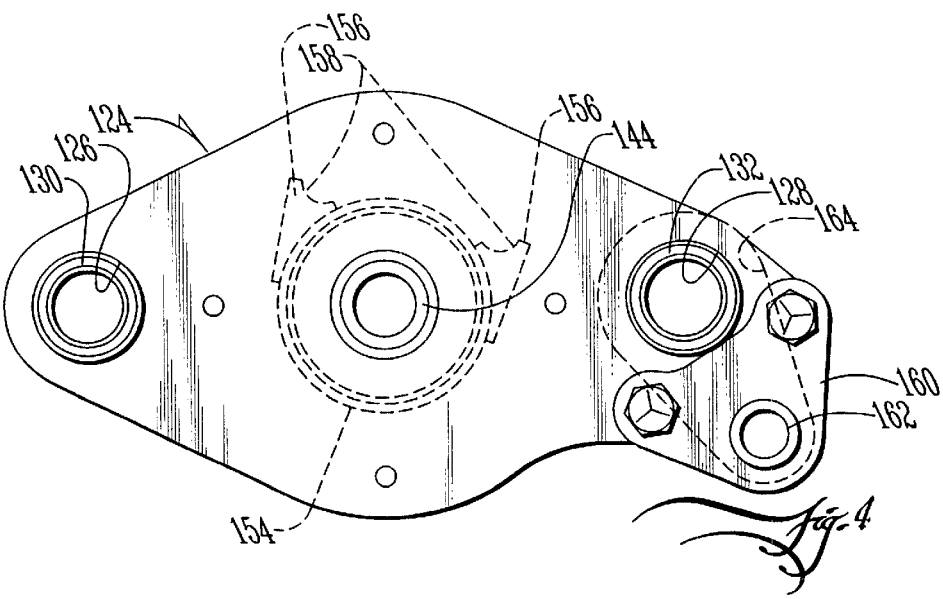
FIG. 4 illustrates a top plan view of the spring plate assembly of the present invention.
Figure 5:
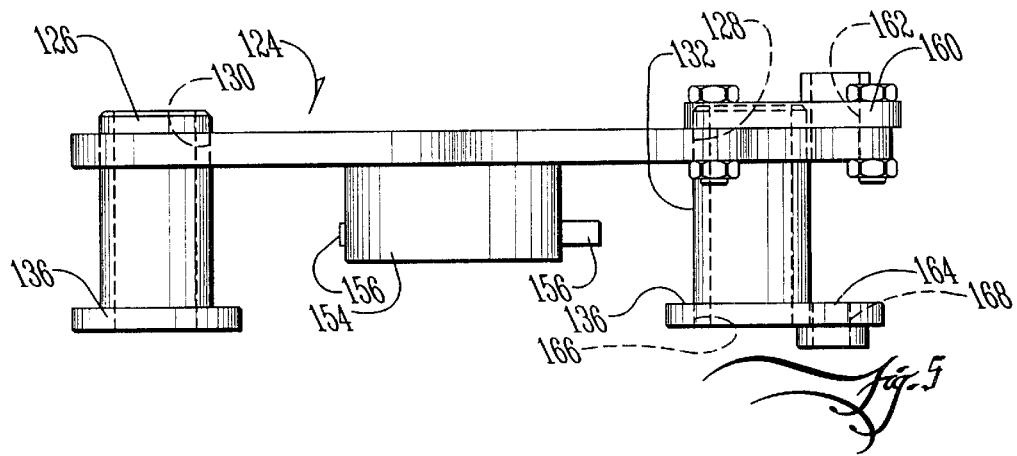
FIG. 5 illustrates a side elevation of the spring plate of FIG. 4.

As shown in FIGS. 4 and 6, the spring plate (124) is provided with a collar (154), which covers the bearing assembly (138), inner spacer (140) and bearing cup (142). Secured to the collar (154) by weldments or similar securement means is a pair of steel steering stops (156). The steering stops (156) are preferably provided with recesses (158) configured for mating engagement with the post (82) of the stop arm (78). Bolted to the spring plate (124) is a trunion plate (160) provided with a bore (162). A trunion mounting ear (164) is provided with a first bore (166) for mounting around the second sleeve (134). The trunion mounting ear (164) is also provided with a second bore (168).

As shown in FIG. 6, a hydraulic piston (170) such as those known in the art is provided with a trunion (172), having a first pin (174) and a second pin (176). As shown in FIG. 7, the first pin (174) of the trunion (172) is positioned within the bore (162) of the trunion plate (160) and the second pin (176) of the trunion (172) was positioned within the second bore (168) of the trunion mounting ear (164). This trunion connection allows the hydraulic piston (170) to pivot laterally relative to the spring plate (124).

The hydraulic piston (170) includes a hydraulic chamber (178) and a shaft (180), slidably coupled thereto (FIGS. 6 and 7). An eyelet bolt (182) is threadably engaged to the shaft (180) of the hydraulic piston (170). A clamp (184) is tightened around the shaft (180) at the point where the eyelet bolt (182) couples to the shaft (180). The eyelet boit (182) is preferably provided with an eyelet (186) provided around its circumference with Orkot® or a similar low-friction material. A bolt (188) extends through the eyelet (186) and the bore (80) of the torque arm (76), and is secured therein by a nut (190).

As shown in FIG. 7, provided over the bolt (72) is a pneumatic air spring (192) such as those known in the art. The pneumatic air spring (192) is bolted or otherwise secured to a top plate (194) which, in turn, is bolted or otherwise secured to the shafts (1 14) and (120). The top plate (194) is preferably provided with a wide, flat surface (196) to increase surface contact with the pneumatic air spring (192). The top plate (194) is also provided with a strengthening rib (198) to transfer force from the pneumatic air spring (192), through the flat surface (196) and through the rib (198) to the shafts (114) and (120). When it is desired to operate the steering assembly of the present invention, the hydraulic piston (170) is coupled to a hydraulic fluid pump (200).

As shown in FIGS. 1 and 7, if hydraulic fluid is pumped from the hydraulic fluid pump (200) into the hydraulic piston (170) so as to extend the shaft (180), the eyelet bolt (182) forces the torque arm (76) of the base plate (74) to rotate. This action causes the collar (86) on the bottom of the base plate (74) to force the torque transfer block (68), and the inner let (58) to which it is connected, to rotate and turn the front wheels (22) to the right. Conversely, if hydraulic fluid is forced through the hydraulic piston (170) in the opposite direction, so as to retract the shaft (180), the shaft (180) draws the eyelet bolt (182) and torque arm (76) of the base plate (74) toward the hydraulic chamber (178), thereby causing the front wheels (22) to turn to the left.

To prevent damage to the agricultural sprayer (10), which may result from turning the wheels (22) and (24) too sharply, the steering stops (156) are adjusted to engage the post (82) of the base plate (74) to precisely limit the maximum travel of the base plate (74) relative to the spring plate (124). By moving the hydraulic piston (170) up and down with the pneumatic air spring (192), steering assemblies (34), (36), (38) and (40) are more compact, require less maintenance, and use less parts than prior art steering assemblies.

Figure 8A:
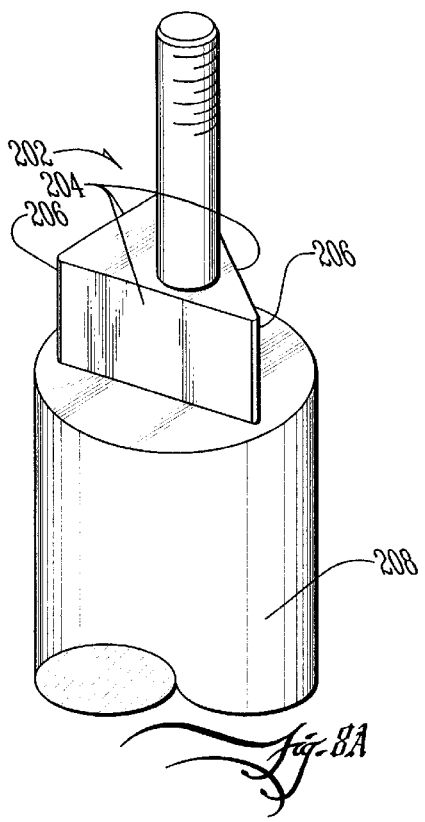
FIG. 8A illustrates a perspective view of an alternative inner leg of the present invention incorporating a triangular torque transfer block.
Figure 8B:
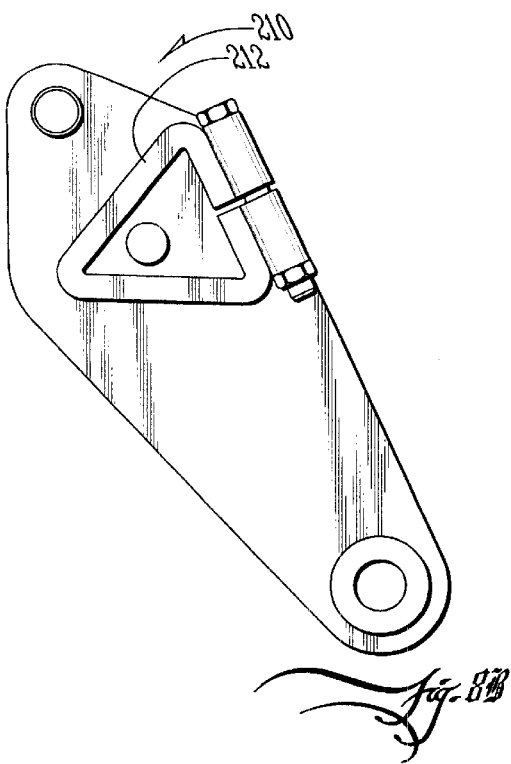
FIG. 8B illustrates a bottom plan view of an alternative base plate, incorporating a triangular collar.

An alternative embodiment of the torque transfer block of the present invention is shown generally as (202) in FIG. 8A. As shown, the torque transfer block (202) is of a generally triangular shape, with three lateral planar surfaces (204) and three corners (206), none of which overhang the cylinder defined by the inner leg (208). The corners (206) and the lateral planar surfaces (204) are contained within the cylinder defined by the inner leg (208), to allow the torque transfer block (202) to pass through any opening large enough to accommodate the inner leg (208). To accommodate the alternative embodiment of the torque transfer block (202), an alternative base plate (210) is provided with a triangular shaped collar (212) (FIGS. 8A and 8B).

Figure 9A:
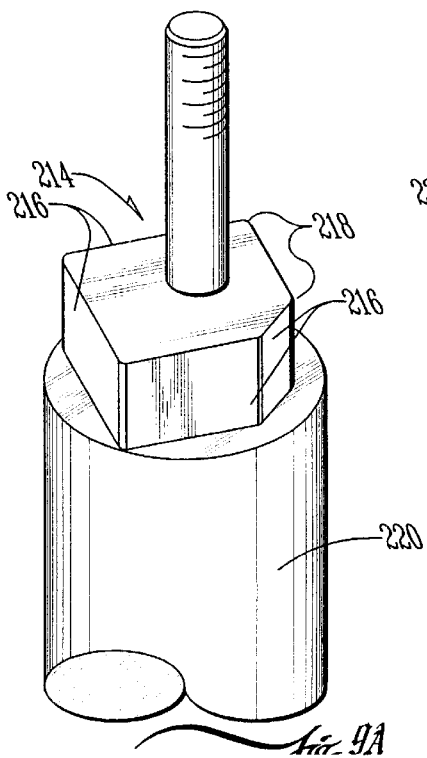
FIG. 9A illustrates a perspective view of a second alternative embodiment of the inner leg of the present invention, incorporating a pentagonal torque transfer block.
Figure 9B:
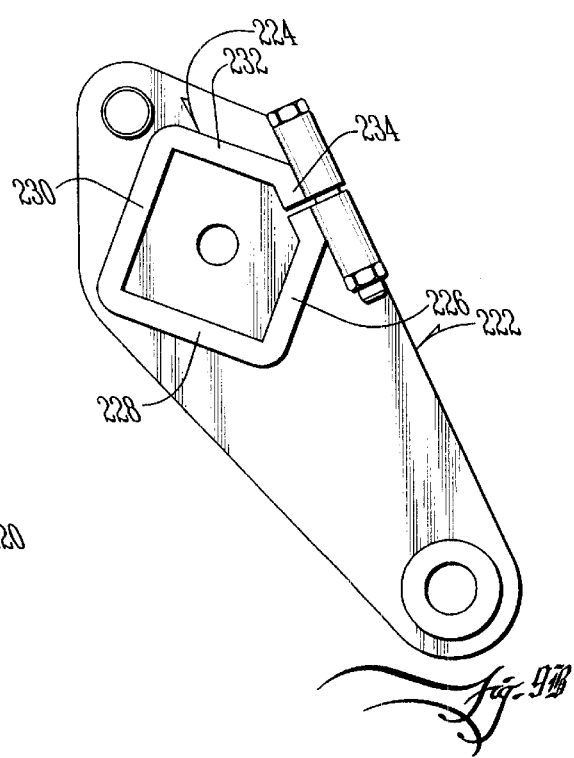
FIG. 9B illustrates a bottom plan view of a second alternative embodiment of the base plate of the present invention, incorporating a pentagonal collar.

A second alternative embodiment of the torque transfer block is shown generally as (214) in FIG. 9A. The torque transfer block is of a generally pentagonal shape, having five substantially planar surfaces (216) and five corners (218), none of which extend over the cylinder defined by the inner leg (220). The second alternative embodiment of the torque transfer block (214) requires a specialized base plate (222) and collar (224) such as that shown in FIG. 9B. In this embodiment, the collar (224) is preferably provided with five walls (226), (228), (230), (232) and (234). Preferably, only three of the walls (226), (228) and (230) are welded to the base plate (222). The fourth wall (232) and fifth, split wall, (234) are not welded to the spring plate to allow sufficient movement of the collar (224) to allow it to be securely tightened over the second alternative embodiment of the torque transfer block (214).

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention. For example, it is anticipated that the torque transfer block may be constructed of any suitable dimensions, having at least one substantially planar lateral surface. It is additionally anticipated that in lieu of a collar, the base plate may be provided with an aperture of dimensions similar to the lateral planar surface of the torque transfer block, through which the torque transfer block extends.

What is claimed is:

1. A wheel support assembly for a ride height adjustable vehicle comprising:
   (a) a journal;
   (b) a leg rotatably coupled within the journal, said leg having a first end and a second end;
   (c) a wheel coupled to said first end of said leg;
   (d) wherein said second end of said leg is provided with a torque transfer block;
   (e) a base plate secured to said second end of said leg,
   (f) a collar coupled to said base plate;
   (g) wherein said collar is provided with means for engaging said torque transfer block and substantially preventing movement of said torque transfer block relative thereto;
   (h) a spring having a first end and a second end;
   (i) a spring plate secured to said first end of said spring; and
   (j) means for rotating said base plate relative to said spring plate.

2. The wheel support assembly of claim 1, wherein said lateral planar surface is provided on a substantially polygonal block coupled to said leg.

3. The wheel support assembly of claim 1, wherein said collar defines a substantially polygonal interior.

4. The wheel support assembly of claim 1, wherein said lateral planar surface is provided on a substantially square block coupled to said leg.

5. The wheel support assembly of claim 1, wherein said collar defines a substantially square interior.

6. The wheel support assembly of claim 1, wherein said lateral planar surface is provided on a substantially triangular block coupled to said leg.

7. The wheel support assembly of claim 1, wherein said collar defines a substantially triangular interior.

8. A wheel support assembly for a ride height adjustable vehicle comprising:
   (a) a journal;
   (b) a leg rotatably coupled within the journal, said leg having a first end and a second end;
   (c) a wheel coupled to said first end of said leg;
   (d) wherein said second end of said leg is provided with a block;
   (e) a base plate secured to said second end of said leg,
   (f) a collar coupled to said base plate;
   (g) wherein a portion of said collar is resilient;
   (h) means for biasing said resilient portion of said collar sufficiently to maintain said collar in releasable contact with said block;
   (i) a spring having a first end and a second end;
   (j) a spring plate secured to said first end of said spring; and
   (k) means for rotating said base plate relative to said spring plate.

9. The wheel support assembly of claim 8, wherein said biasing means is a bolt.

10. The wheel support assembly of claim 8, wherein said collar is provided with a cop, wherein a first portion of said top is secured to said base plate and wherein a second portion of said top is not secured to said base plate.

11. The wheel support assembly of claim 8, wherein said block is provided with a lateral surface, and wherein said biasing means is a bolt sufficient to bias said collar substantially into contact with said lateral surface.

* * * * *